United States Patent [19]

Kulprathipanja et al.

[11] 4,421,567

[45] Dec. 20, 1983

[54] SEPARATORY PROCESS USING ORGANIC BOUND ADSORBENTS

[75] Inventors: Santi Kulprathipanja, Hoffman Estates; Armand J. deRosset, Clarendon Hills, both of Ill.

[73] Assignee: UOP Inc., Des Plaines, Ill.

[21] Appl. No.: 365,434

[22] Filed: Apr. 5, 1982

Related U.S. Application Data

[62] Division of Ser. No. 160,521, Jun. 18, 1980, Pat. No. 4,337,171.

[51] Int. Cl.³ .................. B01J 20/18; C13D 3/12; C13D 3/14
[52] U.S. Cl. .................. 127/46.3; 210/679; 210/691
[58] Field of Search .............. 127/46.3, 46.2, 46.1; 210/673, 679, 691, 692; 536/124, 1.1; 252/430, 455 Z

[56] References Cited

U.S. PATENT DOCUMENTS

| | | | |
|---|---|---|---|
| 3,044,904 | 7/1962 | Serbia | 127/46.3 |
| 3,044,905 | 7/1962 | Lefevre | 127/46.3 |
| 3,416,961 | 12/1968 | Mountfort et al. | 127/46.2 |
| 3,951,859 | 4/1976 | Inaba et al. | 252/430 |
| 4,025,357 | 5/1977 | Leiser et al. | 127/46.2 |
| 4,101,338 | 7/1978 | Rapaport et al. | 127/46.3 |
| 4,133,755 | 1/1979 | Tarao et al. | 210/679 |
| 4,140,653 | 2/1979 | Imura et al. | 252/430 |
| 4,248,737 | 2/1981 | Kulprathipanja | 127/46.3 X |
| 4,363,672 | 12/1982 | Kulprathipanja | 210/691 X |

*Primary Examiner*—Kenneth M. Schor
*Attorney, Agent, or Firm*—James R. Hoatson, Jr.; Louis A. Morris; William H. Page, II

[57] ABSTRACT

A process for separating a component from a feed blend comprising an aqueous solution of a mixture of different components, such as a blend of saccharides. In the process the blend is contacted with an adsorbent comprising a crystalline aluminosilicate and cation exchange resin mixture which selectively adsorbs a component from the feed blend. The adsorbed component is then recovered by contacting the adsorbent with a desorbent material such as water to effect the desorption of the adsorbed component from the adsorbent. There is an undesirable tendency for the silicon constituent of a crystalline aluminosilicate to dissolve in an aqueous system and for the volume of a cationic exchange resin to change with the ionic strength of an aqueous medium. The adsorbent of this invention is dispersed in a binder material comprising a water permeable organic polymer and the effect is a substantial reduction of the undesirable dissolution and volume changes. The adsorbent is manufactured by mixing together powder of the crystalline aluminosilicate, powder of the cationic exchange resin, powder of the organic polymer binder, and a liquid organic solvent, extruding the mixture into an extrudate and drying the extrudate.

8 Claims, No Drawings

SEPARATORY PROCESS USING ORGANIC BOUND ADSORBENTS

CROSS REFERENCE TO RELATED APPLICATIONS

This application is a division of my prior copending application Ser. No. 160,521 filed June 18, 1980 and issued on June 29, 1982 as U.S. Pat. No. 4,337,171, incorporated herein by reference.

BACKGROUND OF THE INVENTION

1. Field of the Invention

The field of art to which this invention pertains is solidbed absorptive separation. More specifically, the invention relates to an improved adsorbent, method of manufacture of the adsorbent and process for separating a component from a mixture comprising an aqueous solution of a mixture of different components using the adsorbent, the adsorbent comprising a crystalline aluminosilicate and cationic exchange resin dispersed in a water permeable organic polymer binder material and having the capability of selectively adsorbing a component from the feed mixture.

2. Prior Art

It is known in the separation art that certain crystalline aluminosilicates referred to as zeolites can be used in the separation of a component from an aqueous solution of a mixture of different components. For example, adsorbents comprising crystalline aluminosilicate are used in the method described in U.S. Pat. No. 4,014,711 to separate fructose from a mixture of sugars in aqueous solution including fructose and glucose.

It is also known that crystalline aluminosilicates or zeolites are used in adsorption processing in the form of agglomerates having high physical strength and attrition resistance. Methods for forming the crystalline powders into such agglomerates include the addition of an inorganic binder, generally a clay comprising silicon dioxide and aluminum oxide, to the high purity zeolite powder in wet mixture. The blended clay zeolite mixture is extruded into cylindrical type pellets or formed into beads which are subsequently calcined in order to convert the clay to an amorphous binder of considerable mechanical strength. As binders, clays of the kaolin type are generally used.

Organic polymer binders are also known to the art.

Zeolite crystal and inorganic binder agglomerates have long been known to have the property of gradually disintegrating as a result of continuous contact with water. This disintegration has been observed as a silicon presence or contamination in the solution in contact with the adsorbent. Such contamination may at times be sufficiently severe to impart a cloudy appearance to the solution.

It is known in the separation art that certain ion (i.e. cation) exchange resins can be used in separating components from a fluid mixture, particularly a saccharide from an aqueous solution of saccharides. Examples of such art are U.S. Pat. Nos. 4,025,357; 4,022,637; 3,928,193; 3,817,787; 3,806,363; 3,692,582; 3,416,961; 3,184,334; 3,174,876; 3,044,906; 3,044,904; and 2,813,810. Common ion exchange resins used in the prior art processes are alkali metal and alkaline earth metal salts of a polystyrene sulfonate cation exchange resin cross-coupled with divinyl benzene. The art recognizes a tendency of such resins to expand or contract in volume, depending on the ionic strength of the aqueous medium in which they are placed. When the resin is used for separating components from an aqueous stream by passing the stream through a column packed with the resin as an adsorbent, such tendency results in a lack of packing uniformity and homogeneity of resin particle size which in turn causes extreme variance, i.e. rise, in the pressure drop through the column.

We have discovered an improved adsorbent comprising a mixture of crystalline aluminosilicate and cation exchange resin dispersed in a water permeable organic polymer binder, a method of manufacturing the adsorbent and an improvement to an aqueous separation process which minimizes the disintegration of the adsorbent and silicon contamination of the product as well as the aforementioned problems inherent in the tendency of the resin to change volume.

SUMMARY OF THE INVENTION

Accordingly, the objectives of our invention are (1) to provide a process for the separation of a component from a feed mixture comprising different components in aqueous solution by contacting the mixture with an adsorbent; (2) to develop a specific adsorbent composition suitable for use in the process of the first stated objective, comprising a mixture of crystalline aluminosilicate and ion exchange resin dispersed in a binder material comprising a water permeable organic polymer, so as to minimize the dissolution of the crystalline aluminosilicate and silica contamination of the product as well as the effects of volume change in the resin; and (3) to provide a method of manufacture of such adsorbent.

In brief summary, our invention is, in one embodiment, a process for the separation of a component from a feed stream comprising an aqueous solution of a blend of components. The solution is contacted with an adsorbent comprising a mixture of a crystalline aluminosilicate and a cation exchange resin, the mixture exhibiting an adsorptive selectivity towards the component. The mixture is dispersed in a binder material comprising a water permeable organic polymer. The component is thereby selectively adsorbed from the blend, and is thereafter recovered.

In still another embodiment, our invention is a method for the manufacture of an adsorbent comprising a mixture of a crystalline aluminosilicate and a cation exchange resin, the mixture being dispersed in a water permeable organic polymer binder. The adsorbent is suitable for use in a process for the separation of a component from a feed mixture comprising an aqueous solution of a mixture of components. The method comprises: (a) mixing together a powder of the crystalline aluminosilicate, a powder of the resin, a powder of the binder and a liquid organic solvent to form a malleable mixture; (b) forming the malleable mixture into discrete formations; (c) removing the solvent from the formations to obtain hard dry formations; and (d) breaking the hard dry formations into particles of desired sizes.

At the outset the definitions of various terms used throughout the specification will be useful in making clear the operation, objects and advantages of our process.

A feed mixture is a mixture containing one or more extract components and one or more raffinate components to be separated by our process. The term "feed stream" indicates a stream of a feed mixture which passes to the adsorbent used in the process.

An "extract component" is a component that is more selectively adsorbed by the adsorbent while a "raffinate component" is a component that is less selectively adsorbed. The term "desorbent material" shall mean generally a material capable of desorbing an extract component. The term "desorbant stream" or "desorbent input stream" indicates the stream through which desorbent material passes to the adsorbent. The term "raffinate stream" or "raffinate output stream" means a stream through which a raffinate stream can vary from essentially 100% desorbent material to essentially 100% raffinate components. The term "extract stream" or "extract output stream" shall mean a stream through which an extract material which has been desorbed by a desorbant material is removed from the adsorbent. The composition of the extract stream, likewise, can vary from essentially 100% desorbent material to essentially 100% extract components. At least a portion of the extract stream, and preferably at least a portion of the raffinate stream, from the separation process are passed to separation means, typically fractionators or evaporators, where at least a portion of desorbent material is separated to produce an extract product and a raffinate product. The terms "extract product" and "raffinate product" mean products by the process containing, respectively, an extract component and a raffinate component in higher concentrations than those found in the extract stream and the raffinate stream.

The term "selective pore volume" of the adsorbent is defined as the volume of the adsorbent which selectively adsorbs an extract component from the feed mixture. The term "non-selective void volume" of the adsorbent is the volume of the adsorbent which does not selectively retain an extract component from the feed mixture. This volume includes the cavities of the adsorbent which contain no adsorptive sites and the interstitial void spaces between adsorbent particles. The selective pore volume and the non-selective void volume are generally expressed in volumetric quantities and are of importance in determining the proper flow rates of fluid required to be passed into an operational zone for efficient operations to take place for a given quantity of adsorbent. When adsorbent "passes" into an operational zone (hereinafter defined and described) employed in one embodiment of this process, its non-selective void volume, together with its selective pore volume, carries fluid into that zone. The non-selective void volume is utilized in determining the amount of fluid which should pass into the same zone in a counter-current direction to the adsorbent to displace the fluid present in the non-selective void volume. If the fluid flow rate passing into a zone is smaller than the non-selective void volume rate of adsorbent material passing into that zone, there is a net entrainment of liquid into the zone by the adsorbent. Since this net entrainment is a fluid present in non-selective void volume of the adsorbent, it, in most instances, comprises less selectively retained feed components. The selective pore volume of an adsorbent can in certain instances adsorb portions of raffinate material from the fluid surrounding the adsorbent, since in certain instances there is competition between extract material and raffinate material for adsorptive sites within the selective pore volume. If a large quantity of raffinate material with respect to extract material surrounds the adsorbent, raffinate material can be competitive enough to be adsorbed by the adsorbent.

The so-called "simple sugars" are classified as monosaccharides and are those sugars which upon hydrolysis do not break down into smaller simpler sugars. One may further classify monosaccharides as aldoses or ketoses, depending upon whether they are hydroxy aldehydes or hydroxy ketones, and by the number of carbon atoms in the molecule. Most common and well known are probably the hexoses. Common ketohexoses are fructose (levulose) and sorbose; common aldohexoses are glucose (dextrose), mannose and galactose. The term "oligosaccharides", as commonly understood in the art and as used herein, means simple polysaccharides containing a known number of constituent monosaccharide units. An oligosaccharide that breaks up upon hydrolysis into two monosaccharide units is called a disaccharide, examples being sucrose, maltose, and lactose. Those giving three such units are trisaccharides, of which raffinose and melezitose are examples. Di-, tri- and tetra-saccharides comprise practically all of the oligosaccharides. The term "polysaccharide" includes oligosaccharides but usually it refers to carbohydrate materials of much higher molecular weight, namely, those that are capable of breaking up on hydrolysis into a large number of monosaccharide units. Typical polysaccharides are starch, glycogen, cellulose and pentosans.

Feed mixtures which can be charged to the process of our invention may, for example, be aqueous solutions of one or more aldoses and one or more ketoses, or one or more momosaccharides and one or more oligosaccharides. The concentration of solids in the solutions may range from about 0.5 wt. % to about 50 wt. % or more, but preferably will be from about 5 wt. % to about 35 wt. %. Starch syrups such as corn syrup are examples of feed mixtures which can be charged to our process. Such syrups are produced by the partial hydrolysis of starch generally in the presence of mineral acids or enzymes. Corn syrup produced in this manner will typically contain 25 to 75 wt. % solids comprising 90 to 95% glucose and 5 to 10% maltose and higher oligosaccharides. A portion of the glucose in this corn syrup may be isomerized with an isomerizing enzyme to produce a high fructose corn syrup, typically comprising 40–45% fructose, 50–55% glucose and 5–10% oligosaccharides, which can also be charged to our process. The pH of the aqueous solution comprising the feed mixture may be from about 5.0 to about 8.0.

Desorbent materials used in various prior art adsorptive separation processes vary depending upon such factors as the type of operation employed. In the swing-bed system, in which the selectively adsorbed feed component is removed from the adsorbent by a purge stream, desorbent selection is not as critical and desorbent material comprising gaseous hydrocarbons such as methane, ethane, etc., or other types of gases such as nitrogen or hydrogen, may be used at elevated temperatures or reduced pressures or both to effectively purge the adsorbed feed component from the adsorbent. However, in adsorptive separation processes which are generally operated continuously at substantially constant pressures and temperatures to insure liquid phase, the desorbent material must be judiciously selected to satisfy many criteria. First, the desorbent material should displace an extract component from the adsorbent with reasonable mass flow rates without itself being so strongly adsorbed as to unduly prevent an extract component from displacing the desorbent material in a following adsorption cycle. Expressed in terms of the selectively (hereinafter discussed in more detail), it is preferred that the adsorbent be more selective for all of the extract components with respect to a raffinate component than it is for the desorbent material with respect to a raffinate component. Secondly, desorbent materials must be compatible with the particular adsorbent and the particular feed mixture. More specifically, they must not reduce or destroy the critical selectivity of the adsorbent for an extract component with respect to a raffinate component. Additionally, desorbent materials should not chemically react with or cause a chemical reaction of either an extract component or a raffinate component. Both the extract stream and the raffinate stream are typically removed from the adsorbent in admixture with desorbent material and any chemical reaction involving a desorbent material and an extract component or a raffinate component would reduce the purity of the extract product or the raffinate product or both. Since both the raffinate stream and the extract stream typically contain desorbent materials, desorbent materials should additionally be substances which are easily separable from the feed mixture that is passed into the process. Without a method of separating at least a portion of the desorbent material present in the extract stream and the raffinate stream, the concentration of an extract component in the extract product and the concentration of a raffinate component in the raffinate product would not be very high, nor would the desorbent material be available for reuse in the process. It is contemplated that at least a portion of the desorbent material will be separated from the extract and the raffinate streams by distillation or evaporation, but other separation methods such as reverse osmosis may also be employed alone or in combination with distillation or evaporation. Since the raffinate and extract products are foodstuffs intended for human consumption, desorbent materials should also be non-toxic. Finally, desorbent materials should also be materials which are readily available and therefore reasonable in cost.

We consider water having a pH of from about 5.0 to about 8.0 satisfies these criteria and is a suitable and preferred desorbent material for our process. The pH of the desorbent material is important because adsorption of a component by the adsorbent, removal of a raffinate stream, desorption of the component from the adsorbent and removal of an extract stream all typically occur in the presence of desorbent material. If the desorbent material is too acidic or too alkaline, chemical reactions of the components are promoted and reaction products are produced that can reduce the yield purity of either the extract or raffinate product, or both.

Water pH does of course vary widely depending upon the source of the water in addition to other factors. Methods of maintaining and controlling a desired water pH are, however, well known to those skilled in the art of water treating. Such methods generally comprise adding an alkaline compound such as sodium hydroxide or an acid compound such as hydrochloric acid to the water in amounts as necessary to achieve and maintain the desired pH.

The prior art has recognized that certain characteristics of adsorbents are highly desirable, if not absolutely necessary, to the successful operation of a selective adsorption process. Such characteristics are equally important to this process. Among such characteristics are: adsorptive capacity for some volume of an extract component per volume of adsorbent; the selective adsorption of an extract component with respect to a raffinate component and the desorbent material; and sufficiently fast rates of adsorption and desorption of an extract component to and from the adsorbent. Capacity of the adsorbent for adsorbing a specific volume of an extract component is, of course, a necessity; without such capacity the adsorbent is useless for adsorptive separation. Furthermore, the higher the adsorbent's capacity for an extract component the better is the adsorbent. Increased capacity of a particular adsorbent makes it possible to reduce the amount of adsorbent needed to separate an extract component of known concentration contained in a particular charge rate of feed mixture. A reduction in the amount of adsorbent required for a specific adsorptive separation reduces the cost of the separation process. It is important that the good initial capacity of the adsorbent be maintained during actual use in the separation process over some economically desirable life. The second necessary adsorbent characteristic is the ability of the adsorbent to separate components of the feed; or, in other words, that the adsorbent possess adsorptive selectivity (B), for one component as compared to another component. Relative selectivity can be expressed not only for one feed component as compared to another but can also be expressed between any feed mixture component and the desorbent material. The selectivity (B), as used throughout this specification is defined as the ratio of the two components of the adsorbed phase over the ratio of the same two components in the unadsorbed phase at equilibrium conditions. Relative selectivity is shown as Equation 1 below:

$$\text{Selectivity} = (B) = \frac{[\text{vol. percent } C/\text{vol. percent } D]_A}{[\text{vol. percent } C/\text{vol. percent } D]_U} \quad \text{Equation 1}$$

where C and D are two components of the feed represented in volume percent and the subscripts A and U represent the adsorbed and unadsorbed phases respectively. The equilibrium conditions were determined when the feed passing over a bed of adsorbent did not change composition after contacting the bed of adsorbent. In other words, there was no net transfer of material occurring between the unadsorbed and adsorbed phases. Where selectivity of two components approaches 1.0 there is no preferential adsorption of one component by the adsorbent with respect to the other; they are both adsorbed (or non-adsorbed) to about the same degree with respect to each other. As the (B) becomes less than or greater than 1.0 there is a preferential adsorption by the adsorbent for one component with respect to the other. When comparing the selectivity by the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C and an adsorbed phase richer in component D. Ideally, desorbent materials should have a selectivity equal to about 1 or slightly less than 1 with respect to all extract components so that all of the extract components can be desorbed as a class with reasonable flow rates of desorbent material and so that extract components can displace desorbent material in a subsequent adsorption step. While separation of an extract component from a raffinate component is theoretically possible when the selectivity of the adsorbent for the extract component with respect to the raffinate component is greater than 1.0, it is preferred that such selectivity be greater than 2.0. Like relative volatility, the higher the selectivity the easier the separation is to perform. Higher selectivities permit a smaller amount of adsorbent to be used. The third important characteristic is the rate of exchange of the extract component of the feed mixture material or, in other words, the relative rate of desorption of the extract component. This characteristic relates directly to the amount of desorbent material that must be employed in the process to recover the extract component from the adsorbent; faster rates of exchange reduce the amount of desorbent material needed to remove the extract component and therefore permit a reduction in the operating cost of the process. With faster rates of exchange, less desorbent material has to be pumped through the process and separated from the extract stream for reuse in the process.

Adsorbents to be used in the process of this invention will contain specific crystalline aluminosilicates or molecular sieves. Particular crystalline aluminosilicates encompassed by the present invention include crystalline aluminosilicate cage structures in which the alumina and silica tetrahedra are intimately connected in an open three dimensional network to form cage-like structures with window-like pores of about 8 Å free diameter. The tetrahedra are cross-linked by the sharing of oxygen atoms with spaces between the tetrahedra occupied by water molecules prior to partial or total dehydration of this zeolite. The dehydration of the zeolite results in crystals interlaced with cells having molecular dimensions and thus the crystalline aluminosilicates are often referred to as "molecular sieves", particularly when the separation which they effect is dependent essentially upon differences between the sizes of the feed molecules as, for instance, when smaller normal paraffin molecules are separated from larger isoparaffin molecules by using a particular molecular sieve.

In hydrated form, the crystalline aluminosilicates used in the process of our invention generally encompass those zeolites represented by the Formula 1 below:

Formula 1

$$M_{2/n}O:Al_2O_3:wSiO_2:yH_2O$$

where "M" is a cation which balances the electrovalence of the aluminum-centered tetrahedra and which is generally referred to as an exchangeable cationic site, "n" represents the valence of the cation, "w" represents the moles of SiO$_2$, and "y" represents the moles of water. The generalized cation "M" may be monovalent, divalent or trivalent or mixtures thereof.

The prior art has generally recognized that adsorbents comprising X and Y zeolites can be used in certain adsorptive separation processes. These zeolites are described and defined in U.S. Pat. Nos. 2,882,244 and 3,130,007, respectively incorporated herein by reference thereto. The X zeolite in the hydrated or partially hydrated form can be represented in terms of mole oxides as shown in Formula 2 below:

Formula 2

$$(0.9\pm0.2)M_{2/n}O:Al_2O_3:(2.50\pm0.5)SiO_2:yH_2O$$

where "M" represents at least one cation having a valence of not more than 3, "n" represents the valence of "M", and "y" is a value up to about 9 depending upon the identity of "M" and the degree of hydration of the crystal. As noted from Formula 2, the SiO$_2$/Al$_2$O$_3$ mole ratio of X zeolite is 2.5±0.5. The cation "M" may be one or more of a number of cations such as a hydrogen cation, an alkali metal cation, or an alkaline earth cation, or other selected cations, and is generally referred to as an exchangeable cationic site. As the X zeolite is initially prepared, the cation "M" is usually predominately sodium, that is, the major cation at the exchangeable cationic sites is sodium and the zeolite is therefore referred to as sodium-X zeolite. Depending upon the purity of the reactants used to make the zeolite, other cations mentioned above may be present, however, as impurities. The Y zeolite in the hydrated or partially hydrated form can be similarly represented in terms of mole oxides as in Formula 3 below:

Formula 3

$$(0.9\pm0.2)M_{2/n}O:Al_2O_3:wSiO_2:yH_2O$$

where "M" is at least one cation having a valence not more than 3, "n" represents the valence of "M", "w" is a value greater than about 3 up to about 6, and "y" is a value up to about 9 depending upon the intensity of "M" and the degree of hydration of the crystal. The SiO$_2$/Al$_2$O$_3$ mole ratio for Y zeolites can thus be from about 3 to about 6. Like the X zeolite, the cation "M" may be one or more of a variety of cations but, as the Y zeolite is initially prepared, the cation "M" is also usually predominately sodium. A Y zeolite containing predominately sodium cations at the exchangeable cationic sites is therefore referred to as a sodium-Y zeolite.

Cations occupying exchangeable cationic sites in the zeolite may be replaced with other cations by ion exchange methods well known to those having ordinary skill in the field of crystalline aluminosilicates. Such methods are generally performed by contacting the zeolite or an adsorbent material containing the zeolite with an aqueous solution of the soluble salt of the cation or cations desired to be placed upon the zeolite. After the desired degree of exchange takes place, the sieves are removed from the aqueous solution, washed, and dried to a desired water content. By such methods the sodium cations and any non-sodium cations which might be occupying exchangeable sites as impurities in a sodium-X or sodium-Y zeolite can be partially or essentially completely replaced with other cations. It is preferred that the zeolite used in the process of our invention contain cations at exchangeable cationic sites selected from the group consisting of the alkali metals and the alkaline earth metals.

The adsorbents to be used in the process of this invention will also contain cation exchange resin which may comprise any of those normally used in the art for chromatographically separating organic and inorganic substances in ion exchange resin beds. Suitable resins include the alkali metal and the alkaline earth metal salts of a nuclearly sulfonated polystyrene cation exchange resin containing a cross-linking agent. A preferred resin for use in separating fructose from a mixture of fructose and glucose is ion exchanged with calcium ions and is cross-linked with about 4.0% by weight of divinylbenzene.

Typically, adsorbents known to the prior art used in separative processes contain zeolite crystals and amorphous material. The zeolite will typically be present in the adsorbent in amounts ranging from about 75 wt. % to about 98 wt. % based on volatile free composition. Volatile free compositions are generally determined after the adsorbent has been calcined at 900° C. in order to drive off all volatile matter. The remainder of the adsorbent will generally be an amorphous inorganic material such as silica, or silica-alumina mixtures or compounds, such as clays, which material is present in intimate mixture with the small particles of the zeolite material. This amorphous material may be an adjunct of the manufacturing process for zeolite (for example, intentionally incomplete purification of either zeolite during its manufacture) or it may be added to relatively pure zeolite, but in either case its usual purpose is as a binder to aid in forming or agglomerating the hard crystalline particles of the zeolite. Normally, the adsorbent will be in the form of particles such as extrudates, aggregates, tablets, macrospheres or granules having a desired particle size range. The typical adsorbent will have a particle size range of about 16–40 mesh (Standard U.S. Mesh). Examples of zeolites used in adsorbents known to the art, either as is or after cation exchange, are "Molecular Sieves 13X" and "SK-40" both of which are available from the Linde Company, Tonawanda, N.Y. The first material of course contains X zeolite while the latter material contains Y zeolite. It is known that X or Y zeolites possess the selectivity requirement and other necessary requirements previously discussed and are therefore suitable for use in separation processes.

In contradistinction to adsorbents known to the art, the adsorbent of our invention comprises a mixture of zeolite and cation exchange resin, and has incorporated therein a binder material comprising a water permeable organic polymer. To be water permeable, the organic polymer, when a dry solid, will have throughout its mass small void spaces and channels which will allow an aqueous solution to penetrate the polymer and thereby come into contact with the zeolite particles and cation exchange resin bound by the polymer. We have found cellulose nitrate and/or cellulose esters such as cellulose acetate to be particularly suitable for use in the adsorbent of our invention. The preferred concentration of the organic polymer in the adsorbent is from about 20.0 to about 35.0 wt. %, while the content of the cation exchange resin is from about 5.0 wt. % to about 35.0 wt. %, and the weight ratio of the crystalline aluminosilicate to the resin is from about 1.0 to about 3.0.

Like some of the above discussed adsorbents of the known art, the adsorbent of our invention is in the form of particles having a particle size range of about 16–80 mesh (Standard U.S. Mesh). Unlike the known art adsorbents, however, the adsorbents of our invention do not require calcining, and, most important, achieve substantially reduced disintegration of the zeolite and silicon contamination of the product stream when used in the process of our invention. The reduced disintegration is one achievement of our invention which results in minimization of the undesirable increase in pressure drop through the column in which the adsorbent is packed as compared to the inevitable high increase associated with the adsorbents of the known art.

Another achievement of the adsorbent of our invention is the utilization of the proven capabilities of cation exchange resins as adsorbents, without the problem caused by the tendency of the resin, as liquid is forced through it, to change shape and become compacted whereby the interstitial void spaces between the adsorbent particles decrease in volume. Such tendency results in a dramatic and exponential, with time, increase in the pressure drop through the resin bed, particularly when the resin bed is packed into an adsorption column, and has heretofore necessitated the eventual cessation of the operation to deal with the problem. Of course, the resin powders incorporated into the adsorbent particles of our invention still expand and contract depending on the ionic strength of the aqueous medium. However, the volumetric integrity of the adsorbent particle as a whole is not effected by the changes in volume of the resin powders, because the void spaces and channels in the organic polymer binder are able to accommodate these changes.

The adsorbent of our invention is manufactured by mixing together powder of the crystalline aluminosilicate, powder of the cation exchange resin, powder of the water permeable organic polymer binder, and a liquid organic solvent to make the mixture malleable, forming the mixture into discrete formations, removing the solvent from the formations and breaking the formations into the desired sized particles. The forming of the malleable mixture is preferably done by extrusion. The aluminosilicate, resin and binder powders may first be mixed together and the solvent added to the powder mixture, or the binder powder may be first dissolved in the solvent and the aluminosilicate and resin powder added to the solution. Preferred liquid organic solvents are acetic acid, p-dioxane, methyl-ethyl ketone, acetone, chloroform, benzyl alcohol, ethyl acetate and cyclohexanone, any of which may be mixed with formamide. The solvent is removed from the formations either by water washing followed by drying at a temperature not exceeding about 100° C., or by just drying at that temperature. The formations are broken into particles having a preferred size such that the particles will pass through a No. 16 screen and be retained on a No. 80 screen. Any fines resulting from the breaking of the particles not retained on a No. 80 screen may be added to the aluminosilicate-resin-solvent-binder mixture. The particles may be further treated to effect ion exchange between cations at exchangeable cationic sites on the crystalline aluminosilicate and cation exchange resin in the particles and cations preferably selected from the group consisting of alkali metals and alkali earth metals.

The adsorbent may be employed in the form of a dense compact fixed bed which is alternatively contacted with the feed mixture and desorbent materials. In the simplest embodiment of the invention, the adsorbent is employed in the form of a single static bed in which case the process is only semi-continuous. In another embodiment, a set of two or more static beds may be employed in fixed-bed contacting with appropriate valving so that the feed mixture is passed through one or more adsorbent beds while the desorbent materials can be passed through one or more of the other beds in the set. The flow of feed mixture and desorbent materials may be either up or down through the desorbent. Any of the conventional apparatus employed in static bed fluid-solid contacting may be used.

Counter-current moving-bed or simulated moving-bed counter-current flow systems, however, have a much greater separation efficiency than fixed adsorbent bed systems and are therefore preferred for use in our separation process. In the moving-bed or simulated moving-bed processes the adsorption and desorption operations are continuously taking place which allows both continuous production of an extract and a raffinate stream and the continual use of feed and desorbent streams. One preferred embodiment of this process utilizes what is known in the art as the simulated moving-bed counter-current flow system. The operating principles and sequence of such a flow system are described in U.S. Pat. No. 2,985,589 incorporated herein by reference thereto. In such a system, it is the progressive movement of multiple liquid access points down an adsorbent chamber that simulates the upward movement of adsorbent contained in the chamber. Only four of the access lines are active at any one time; the feed input stream, desorbent inlet stream, raffinate outlet stream, and extract outlet stream access lines. Coincident with this simulated upward movement of the solid adsorbent is the movement of the liquid occupying the void volume of the packed bed of adsorbent. So that counter-current contact is maintained, a liquid flow down the adsorbent chamber may be provided by a pump. As an active liquid access point moves through a cycle, that is, from the top of the chamber to the bottom, the chamber circulation pump moves through different zones which require different flow rates. A programmed flow controller may be provided to set and regulate these flow rates.

The active liquid access points effectively divided the adsorbent chamber into separate zones, each of which has a different function. In this embodiment of our process, it is generally necessary that three separate operational zones be present in order for the process to take place although in some instances an optional fourth zone may be used.

The adsorption zone, zone 1, is defined as the adsorbent located between the feed inlet stream and the raffinate outlet stream. In this zone, the feed stock contacts the adsorbent, an extract component is adsorbed, and a raffinate stream is withdrawn. Since the general flow through zone 1 is from the feed stream which passes into the zone to the raffinate stream which passes out of the zone, the flow in this zone is considered to be a downstream direction when proceeding from the feed inlet to the raffinate outlet streams.

Immediately upstream with respect to fluid flow in zone 1 is the purification zone, zone 2. The purification zone is defined as the adsorbent between the extract outlet stream and the feed inlet stream. The basic operations taking place in zone 2 are the displacement from the non-selective void volume of the adsorbent of any raffinate material carried into zone 2 by the shifting of adsorbent into this zone and the desorption of any raffinate material adsorbed within the selective pore volume of the adsorbent or adsorbed on the surfaces of the adsorbent particles. Purification is achieved by passing a portion of extract stream material leaving zone 3 into zone 2 at zone 2's upstream boundary, the extract outlet stream, to effect the displacement of raffinate material. The flow of material in zone 2 is in a downstream direction from the extract outlet stream to the feed inlet stream.

Immediately upstream of zone 2 with respect to the fluid flowing in zone 2 is the desorption zone or zone 3. The desorption zone is defined as the adsorbent between the desorbent inlet and the extract outlet stream. The function of the desorption zone is to allow a desorbent material which passes into this zone to displace the extract component which was adsorbed upon the adsorbent during a previous contact with feed in zone 1 in a prior cycle of operation. The flow of fluid in zone 3 is essentially in the same direction as that of zones 1 and 2.

In some instances, an optional buffer zone, zone 4, may be utilized. This zone, defined as the adsorbent between the raffinate outlet stream and the desorbent inlet stream, if used, is located immediately upstream with respect to the fluid flow to zone 3. Zone 4 would be utilized to conserve the amount of desorbent utilized in the desorption step since a portion of the raffinate stream which is removed from zone 1 can be passed into zone 4 to displace desorbent material present in that zone out of that zone into the desorption zone. Zone 4 will contain enough adsorbent so that raffinate material present in the raffinate stream passing out of zone 1 and into zone 4 can be prevented from passing into zone 3, thereby contaminating extract stream removed from zone 3. In the instances in which the fourth operational zone is not utilized, the raffinate stream passed from zone 1 to zone 4 must be carefully monitored in order that the flow directly from zone 1 to zone 3 can be stopped when there is an appreciable quantity of raffinate material present in the raffinate stream passing from zone 1 into zone 3 so that the extract outlet stream is not contaminated.

A cyclic advancement of the input and output streams through the fixed bed of adsorbent can be accomplished by utilizing a manifold system in which the valves in the manifold are operated in a sequential manner to effect the shifting of the input and output streams, thereby allowing a flow of fluid with respect to solid adsorbent in a counter-current manner. Another mode of operation which can effect the counter-current flow of solid adsorbent with respect to fluid involves the use of a rotating disc valve in which the input and output streams are connected to the valve and the lines through which feed input, extract output, desorbent input and raffinate output streams pass are advanced in the same direction through the adsorbent bed. Both the manifold arrangement and disc valves which can be utilized in this operation can be found in U.S. Pat. Nos. 3,040,777 and 3,422,848. Both of the aforementioned patents disclose a rotary type connection valve in which the suitable advancement of the various input and output streams from fixed sources can be achieved without difficulty.

In many instances, one operational zone will contain a much larger quantity of adsorbent than some other operational zone. For instance, in some operations the buffer zone can contain a minor amount of adsorbent as compared to the adsorbent required for the adsorption and purification zones. It can also be seen that in instances in which desorbent is used which can easily desorb extract material from the adsobent that a relatively small amount of adsorbent will be needed in a desorption zone as compared to the adsorbent needed in the buffer zone or adsorption zone or purification zone or all of them. Since it is not required that the adsorbent be located in a single column, the use of multiple chambers or a series of columns is within the scope of the invention.

It is not necessary that all of the input or output streams be simultaneously used, and in fact, in many instances some of the streams can be shut off while others effect an input or output of material. The apparatus which can be utilized to effect the process of this invention can also contain a series of individual beds connected by connecting conduits upon which are placed input or output taps to which the various input or output streams can be attached and alternately and periodically shifted to effect continuous operation. In some instances, the connecting conduits can be connected to transfer taps which during the normal operations do not function as a conduit through which material passes into or out of the process.

It is contemplated that at least a portion of the extract output stream will pass into a separation means wherein at least a portion of the desorbent material can be separated to produce an extract product containing a reduced concentration of desorbent material. Preferably, but not necessary to the operation of the process, at least a portion of the raffinate output stream will also be passed to a separation means wherein at least a portion of the desorbent material can be separated to produce a desorbent stream which can be reused in the process and a raffinate product containing a reduced concentration of desorbent material. The separation means will typically be a fractionation column or an evaporator, the design and operation of either being well known to the separation art.

Reference can be made to D. B. Broughton U.S. Pat. No. 2,985,589, and to a paper entitled "Continuous Adsorptive Processing—A New Separation Technique" by D. B. Broughton presented at the 34th Annual Meeting of the Society of Chemical Engineers at Tokyo, Japan, on Apr. 2, 1969, for further explanation of the simulated moving-bed counter-current process flow scheme.

A dynamic testing apparatus is employed to test various adsorbents with a particular feed mixture and desorbent material to measure the adsorbent characteristics of adsorptive capacity, selectivity and exchange rate. The apparatus consists of an adsorbent chamber of approximately 70 cc volume having inlet and outlet portions at opposite ends of the chamber. The chamber is contained within a temperature control means and, in addition, pressure control equipment is used to operate the chamber at a constant predetermined pressure. Quantitative and qualitative analytical equipment such as refractometers, polarimeters and chromatographs can be attached to the outlet line of the chamber and used to detect quantitatively or determine qualitatively one or more components in the effluent stream leaving the adsorbent chamber. A pulse test, performed using this apparatus and the following general procedure, is used to determine selectivities and other data for various adsorbent systems. The adsorbent is filled to equilibrium with a particular desorbent material by passing the desorbent material through the adsorbent chamber. At a convenient time, a pulse of feed containing known concentrations of a tracer and of a particular ketose or aldose or both, all diluted in desorbent, is injected for a duration of several minutes. Desorbent flow is resumed, and the tracer and the ketose and aldose are eluted as in a liquid-solid chromatographic operation. The effluent can be analyzed on-stream or, alternatively, effluent samples can be collected periodically and later analyzed separately by analytical equipment and traces of the envelopes of corresponding component peaks developed.

From information derived from the test adsorbent, performance can be rated in terms of void volume, retention volume for an extract or a raffinate component, selectivity for one component with respect to the other, the rate of desorption of an extract component by the desorbent and the extent of silica contamination of the extract and raffinate stream. The retention volume of an extract or a raffinate component may be characterized by the distance between the center of the peak envelope of an extract or a raffinate component and the peak envelope of the tracer component or some other known reference point. It is expressed in terms of the volume in cubic centimeters of desorbent pumped during this time interval represented by the distance between the peak envelope. Selectivity, (B), for an extract component with respect to a raffinate component may be characterized by the ratio of the distance between the center of the extract component peak envelope and the tracer peak envelope (or other reference point) to the corresponding distance between the center of the raffinate component peak envelope and the tracer peak envelope. The rate of exchange of an extract component with the desorbent can generally be characterized by the width of the peak envelopes at half intensity. The narrower the peak width the faster the desorption rate.

To further evaluate promising adsorbent systems and to translate this type of data into a practical separation process requires actual testing of the best system in a continuous counter-current moving-bed or simulated moving-bed liquid-solid contacting device. The general operating principles of such a device are as described hereinabove. A specific laboratory-size apparatus utilizing these principles is described in deRosset et al U.S. Pat. No. 3,706,812. The equipment comprises multiple adsorbent beds with a number of access lines attached to distributors within the beds and terminating at a rotary distributing valve. At a given valve position, feed and desorbent are being introduced through two of the lines and the raffinate and extract streams are being withdrawn through two more. All remaining access lines are inactive and when the position of the distributing valve is advanced by one index all active positions will be advanced by one bed. This simulates a condition in which the adsorbent physically moves in a direction counter-current to the liquid flow. Additional details on the above-mentioned adsorbent testing apparatus and adsobent evaluation techniques may be found in the paper "Separation of $C_8$ Aromatics by Adsorption" by A. J. deRosset, R. W. Neuzil, D. J. Korous, and D. H. Rosback presented at the American Chemical Society, Los Angeles, Calif., Mar. 28 through Apr. 2, 1971, incorporated herein by reference.

Although both liquid and vapor phase operations can be used in many adsorptive separation processes, liquid-phase operation is required for this process because of the lower temperature requirements and because of the higher yields of extract product that can be obtained with liquid-phase operation over those obtained with vapor-phase operation. Adsorption conditions will include a temperature range of from about 20° C. to about 200° C. with about 20° C. to about 100° C. being more preferred and a pressure range of from about atmospheric to about 500 psig with from about atmospheric to about 250 psig being more preferred to insure liquid phase. Desorption conditions will include the same range of temperatures and pressures as used for adsorption conditions.

The size of the units which can utilize the process of this invention can vary anywhere from those of pilot-plant scale (see for example our assignee's U.S. Pat. 3,706,812) to those of commercial scale and can range in flow rates from as little as a few cc an hour up to many thousands of gallons per hour.

The following examples are presented to illustrate our invention and are not intended to unduly restrict the scope and spirit of the claims attached hereto.

EXAMPLE I

The purpose of this example is to illustrate the method of manufacture of adsorbents of our invention. Three different adsorbent samples were prepared, each such preparation by the following steps:

(1) Na-Y type zeolite powder was mixed with powder of nuclearly sulfonated polystyrene cation exchange resin, ion exchanged with calcium ions and cross-linked with 4.0% by weight of divinylbenzene, and with an organic polymer comprising cellulose acetate powder for two of the samples, or with cellulose acetate butyrate for one of the samples.

(2) An organic solvent comprising acetic acid was added to the powder mixture slowly and with mulling to obtain an extrudable mixture.

(3) The extrudable mixture was extruded into an extrudate.

(4) The extrudate was dried at 65° C.

(5) The dried extrudate was granulated and screened so as to obtain particles sized from 30 to 60 mesh.

The following Table 1 sets forth details concerning the materials and amounts thereof used in the preparation of the above three adsorbents.

TABLE 1

| No. | Na—Y Zeolite (wt. %) | Cation Exchange Resin (wt. %) | Organic Polymer (wt. %) (Cellulose Acetate except as noted) |
|---|---|---|---|
| 1 | 35.0 | 35.0 | 30.0 |
| 2 | 50.0 | 20.0 | 30.0 |
| 3 | 60.0 | 20.0 | 20.0 (cellulose acetate butyrate) |

EXAMPLE II

The purpose of this example is to present the results of tests of each of the adsorbents, prepared as set forth in the above Example I, in the dynamic testing apparatus hereinbefore described to determine the performance of each such adsorbent with regard to the adsorptive separation of the individual components of an aqueous solution of a mixture of components. Also tested for purposes of comparison with the above three adsorbents of our invention were an adsorbent consisting of only the above described cation exchange resin, and a conventional 20% clay bound calcium exchanged zeolite adsorbent.

The general pulse-test apparatus and procedure have been previously described. In this case, however, no on-stream GC analyzer was used to monitor the effluent. Instead, the effluent was collected in an automatic sample collector, and later each sample was injected into a high pressure liquid chromatograph (HPLC) for analysis. Each sample was collected for a two minute period, and unlike the almost instantaneous component concentration obtained with an on-stream GLC, each sample represented an average of the component concentration over the two minute period of time.

The adsorbent test column consisted of a stainless steel tube 127 cm long and 8.4 mm in internal diameter. This resulted in a test adsorbent bed of 70 cc. The feed consisted of 5 wt. % each of glucose, fructose and sucrose and 20 vol. % of $D_2O$ (deuterium oxide) in deionized water. The desorbent was deionized water with a nominal pH value of 7.0.

The desorbent was run continuously at a rate of 1 ml/min. Both feed and desorbant were pumped under capillary flow control. At some convenient time interval, the desorbent was stopped and the feed which was also run at a rate of 1 ml/min. was pumped for a period of 10 min. to deliver a 10 ml "pulse". Immediately after the feed pulse was completed, the desorbent flow was resumed and sample collection was begun. The two minute samples were collected for a period of 90 minutes, for a total of 45 samples.

The effluent fractions were then sequentially injected into the HPLC for analysis. From the analysis of these fractions, a chromatograph of the separation of the feed components that were present in the feed pulse were constructed. This was accomplished by plotting the peak height of each component versus the volume of effluent represented by the fraction from which the measurements were made. By joining the respective peak heights of each component, peak envelopes of the components were obtained. The composite plot resembled a chromatogram of component peak obtained from an analytical GC or LC of poor resolving power.

The sucrose, which is a disaccharide, evidently cannot enter the smaller selective pores of the adsorbent that the monosaccharides glucose and fructose can enter. Thus, the retention volume of the sucrose as measured, from the center of its peak envelope to the point where the feed pulse was injected, was a measure of the void volume of the bed. The center of the sucrose peak envelope also served as the zero point for measuring the net retention volumes of the glucose, fructose and $D_2O$. The ratio of these net retention volumes was a measure of the selectivity, (B), of the adsorbent for the more strongly adsorbed component (larger net retention volume) with respect to the component that was less strongly adsorbed (smaller net retention volume).

The use of $D_2O$ (deuterium oxide) in this test allowed the measurement of the selectivity between the desorbent, water, and the more strongly adsorbed component or extract, which was fructose. The results for these pulse tests are shown in Table 2. The reference numbers of the three adsorbents are the same as the reference numbers of the corresponding adsorbents of Example I.

It is apparent from the data of Table 2 that the performance of the adsorbents of our invention, with regard to adsorption of components from an aqueous system, does not significantly differ from the conventional cation exchange resin or clay bound adsorbent, although the selectivities of our adsorbents for fructose are superior to the conventional cation exchange resin.

TABLE 2

| | Conventional (20% Clay Binder) | Conventional Cation Exchange Resin | Adsorbent No. 1 | Adsorbent No. 2 | Adsorbent No. 3 |
|---|---|---|---|---|---|
| | | HALF WIDTH (ml) | | | |
| Fructose | 14 | 16.0 | 11.34 | 12.34 | 13.52 |
| Glucose | 12 | 13.6 | 10.89 | 11.36 | 11.96 |
| Sucrose | 12.6 | 14.2 | 11.30 | 11.49 | 12.03 |
| $D_2O$ | 10 | 8.4 | 8.82 | 8.96 | 10.15 |

TABLE 2-continued

|  | Conventional (20% Clay Binder) | Conventional Cation Exchange Resin | Adsorbent No. 1 | Adsorbent No. 2 | Adsorbent No. 3 |
|---|---|---|---|---|---|
| | | RETENTION VOLUME (ml) | | | |
| Fructose | 13.2 | 15.5 | 6.98 | 8.11 | 8.22 |
| Glucose | 2.4 | 6.9 | 2.38 | 2.37 | 2.05 |
| D$_2$O | 12.8 | 20.7 | 12.02 | 14.04 | 13.13 |
| | | B | | | |
| Fructose/Glucose | 5.5 | 2.24 | 2.94 | 3.43 | 4.01 |
| Fructose/D$_2$O | 1.03 | 0.74 | 0.58 | 0.58 | 0.68 |

Such selectivity of the conventional clay bound adsorbent is slightly superior to that of our adsorbents, however, as illustrated below, the conventional adsorbent is far more prone to dissolution. Furthermore, the selectivity of fructose versus water (exemplified by D$_2$O) is less than 1. This has the important economic implication that less water will be required to desorb the fructose from the adsorbent of our invention, as compared to a totally zeolitic adsorbent. Thus the extract will be more concentrated in fructose, and less energy will be required to effect such concentration.

EXAMPLE III

The purpose of this example is to present the results of tests for weight loss of adsorbents of our invention, conventional clay bound adsorbent, and organic polymer bound zeolite adsorbents, when contacted with an aqueous stream. The testing apparatus comprised means for pumping, metering and maintaining a specific temperature of an aqueous stream; a first and second column each of 20 cc capacity in which the adsorbent to be tested was packed; and a first and second filter. The flow of the aqueous stream was from the pumping, metering and temperature control means through the first filter, then through the first column, then through the second column and finally through the second filter. Sample taps enabled sampling of the aqueous stream at points immediately downstream of each filter, the samples from the first tap being referred to as "Effluent from Col. No. 1", and the samples from the second tap being referred to as "Effluent from Col. No. 2". The purpose of having two packed columns was to enable a determination of whether an equilibrium concentration of silicon in the aqueous stream was reached in flowing through the first column, or whether such equilibrium was not reached and the concentration of silicon would continue to increase during flow through the second column.

Three test runs using the above apparatus were made. For the first run, the columns were packed with the conventional clay bound adsorbent described in Example II. In the second run the column was packed with adsorbent of our invention (our adsorbent) comprising the adsorbent number 3 of Example I. In the third run the columns were packed with a cellulose acetate bound Ca-Y faujasite adsorbent. The aqueous stream in each case was at 65° C. and had a pH of 8.5.

Each test run was over an extended period of time during which samples of the aqueous streams were periodically taken from both of the sample taps and analyzed for silicon concentration. The cumulative amount of effluent from the apparatus was measured at each time samples were taken and noted as "Total Raff". The filters were changed whenever they became plugged with particulate matter. The following Tables 3, 4 and 5 present the data obtained from the first run, second run and third run, respectively.

TABLE 3

| Total Raff. (Liters) | Effluent from Col. #1 | | Effluent from Col. #2 | | LHSV Based on 20 cc Column |
|---|---|---|---|---|---|
| | ppm Si | pH | ppm Si | pH | |
| 7.2 | 9.4 | 8.6 | 11.7 | 8.7 | 20.0 |
| 16.8 | 9.4 | 8.7 | 12.7 | 8.7 | 20.0 |
| 27.2 | 7.5 | 8.7 | 10.3 | 8.6 | 20.0 |
| 37.0 | 6.6 | 8.6 | 10.3 | 8.6 | 20.0 |
| 46.6 | 6.1 | 8.7 | 8.9 | 8.6 | 20.0 |
| 56.3 | 5.2 | 8.6 | 9.4 | 8.5 | 20.0 |
| 66.1 | 5.6 | 8.5 | 9.4 | 8.7 | 20.0 |
| 75.5 | 4.7 | 8.7 | 8.0 | 8.7 | 20.0 |
| 85.1 | 5.0 | 8.7 | 8.5 | 8.6 | 20.0 |
| 94.7 | 5.2 | 8.8 | 8.5 | 8.6 | 20.0 |
| 104.3 | 3.8 | 8.4 | 7.1 | 8.6 | 20.0 |
| 106.4 | 11.8 | 8.2 | 14.6 | 8.0 | 2.0 |
| 107.3 | 12.2 | 7.9 | 14.6 | 8.1 | 2.0 |

Adsorbent wt. loss from Col. #1 ≈ 1.87 g.
Adsorbent wt. loss from Col. #2 ≈ 1.10 g.

TABLE 4

| Total Raff. (Liters) | Effluent from Col. #1 ppm Si | Effluent from Col. #2 ppm Si | LHSV Based on 20 cc Column |
|---|---|---|---|
| 7.2 | 10.8 | 15.5 | 20.0 |
| 16.8 | 5.6 | 10.6 | 20.0 |
| 26.4 | 3.8 | 7.5 | 20.0 |
| 36.0 | 3.8 | 5.9 | 20.0 |
| 45.6 | 3.3 | 5.4 | 20.0 |
| 55.3 | 2.8 | 4.9 | 20.0 |
| 64.9 | 2.8 | 4.2 | 20.0 |
| 74.4 | 2.6 | 4.2 | 20.0 |
| 84.0 | 2.4 | 3.8 | 20.0 |
| 87.2 | 10.3 | 13.6 | 2.0 |
| 88.2 | 9.9 | 13.2 | 2.0 |
| 89.2 | 10.3 | 13.4 | 2.0 |
| 90.1 | 9.9 | 12.9 | 2.0 |
| 91.1 | 9.4 | 12.2 | 2.0 |
| 100.4 | 2.6 | 3.8 | 2.0 |

Adsorbent wt. loss from Col. #1 ≈ 0.68 g.
Adsorbent wt. loss from Col. #2 ≈ 0.54 g.

TABLE 5

| Total Raff. (Liters) | Effluent from Col. #1 | | Effluent from Col. #2 | | LHSV Based on 20 cc Column |
|---|---|---|---|---|---|
| | ppm Si | pH | ppm Si | pH | |
| 7.3 | 7.0 | 8.1 | 12.0 | 8.6 | 20.0 |
| 16.9 | 7.5 | 8.8 | 8.9 | 8.6 | 20.0 |
| 26.5 | 3.8 | 8.6 | 5.6 | 8.6 | 20.0 |
| 36.1 | 2.4 | 8.5 | 4.2 | 8.4 | 20.0 |
| 45.7 | 2.8 | 7.9 | 4.2 | 8.5 | 20.0 |
| 55.3 | 2.8 | 8.5 | 4.0 | 8.6 | 20.0 |
| 65.0 | 2.6 | 7.6 | 3.5 | 8.7 | 20.0 |
| 74.1 | 2.6 | 8.5 | 4.2 | 8.7 | 20.0 |
| 78.0 | 10.3 | 7.5 | 13.2 | 8.4 | 2.0 |
| 79.0 | 9.4 | 8.5 | 13.2 | 8.5 | 2.0 |
| 80.2 | 8.5 | 7.8 | 12.2 | 8.3 | 2.0 |
| 86.8 | 3.1 | 7.5 | 4.0 | 8.6 | 20.0 |
| 86.4 | 2.4 | 7.4 | 3.1 | 8.4 | 20.0 |
| 105.9 | 2.4 | 7.9 | 3.3 | 8.3 | 20.0 |

TABLE 5-continued

| Total Raff. (Liters) | Effluent from Col. #1 ppm Si | pH | Effluent from Col. #2 ppm Si | pH | LHSV, Based on 20 cc Column |
|---|---|---|---|---|---|
| 115.4 | 2.4 | 7.1 | 3.1 | 7.1 | 20.0 |

Adsorbent wt. loss from Col. #1 ≈ 0.82 gm.
Adsorbent wt. loss from Col. #2 ≈ 0.44 gm.

From a comparison of the data in the foregoing Tables 3, 4 and 5, it is apparent that substantially less silicon is removed from the adsorbent of our invention by an aqueous stream than from the conventional clay bound adsorbent. Of the two adsorbents, ours imparts a far smaller concentration of silicon to the aqueous stream and suffers a far smaller dissolution measured by weight loss. Furthermore, our adsorbent is no more prone to weight loss than the organic bound zeolite adsorbent. Finally, we observed that the pressure drop through the columns when packed with our adsorbent was no greater than with the conventional adsorbents. From our previous experience, we know that if the columns were packed with only the cation exchange resin the pressure would rapidly build up to the point where operation would be impossible.

We claim as our invention:

1. A process for the separation of one sugar component from a feed stream comprising an aqueous solution of a blend of sugar components, which process comprises:
   (a) contacting said aqueous solution with an adsorbent comprising a mixture of a Type X or Type Y zeolite, from about 20.0 wt% to about 35.0 wt% of a alkali or alkaline earth exchange resin and from about 20.0 wt% to about 35.0 wt% of a water permeable organic polymer binder, wherein the weight ratio of said Type X or Type Y zeolite to said alkali or alkaline earth exchange resin is from about 1.0 to about 3.0, said mixture exhibiting an adsorptive selectivity toward one of said components, thereby selectively adsorbing said component from said blend;
   (b) separating the solution from said adsorbent; and
   (c) thereafter recovering said adsorbed component by desorption thereof from said adsorbent.

2. The process of claim 1 further characterized in that said water permeable organic polymer comprises a cellulose ester or cellulose nitrate.

3. The process of claim 1 further characterized in that said cation exchange resin comprises an alkali metal or alkaline earth metal salt of a nuclearly sulfonated polystyrene cation exchange resin containing a cross-linking agent.

4. The process of claim 3 further characterized in that said cation exchange resin comprises a calcium salt and said cross-linking agent comprises divinylbenzene in an amount comprising about 4.0% by weight of said resin.

5. The process of claim 1 further characterized in that said feed mixture comprises an aqueous solution of saccharides.

6. The process of claim 5 further characterized in that said saccharides comprise a mixture of fructose and glucose.

7. The process of claim 5 further characterized in that recovery of said adsorbed component is effected with a desorbent comprising water.

8. The process of claim 5 further characterized in that the pH of said aqueous solution is from about 5.0 to about 8.0.

* * * * *